United States Patent
Yoshida et al.

(10) Patent No.: US 7,154,376 B2
(45) Date of Patent: Dec. 26, 2006

(54) IN-VEHICLE EQUIPMENT REMOTE CONTROL SYSTEM

(75) Inventors: Koji Yoshida, Obu (JP); Takeshi Kumazaki, Okazaki (JP)

(73) Assignee: Denso Corporation, Kariya (JP)

( * ) Notice: Subject to any disclaimer, the term of this patent is extended or adjusted under 35 U.S.C. 154(b) by 319 days.

(21) Appl. No.: 10/795,343

(22) Filed: Mar. 9, 2004

(65) Prior Publication Data
US 2004/0196141 A1    Oct. 7, 2004

(30) Foreign Application Priority Data
Apr. 2, 2003    (JP)    ............................. 2003-099439

(51) Int. Cl.
*G05B 19/00*    (2006.01)
(52) U.S. Cl. .................... 340/5.63; 340/5.72; 307/10.5
(58) Field of Classification Search ............... 340/5.63, 340/5.61, 5.62, 5.72, 426.36; 307/10.5
See application file for complete search history.

(56) References Cited

U.S. PATENT DOCUMENTS

| 5,736,935 | A | * | 4/1998 | Lambropoulos | ....... 340/825.69 |
| 6,034,617 | A | * | 3/2000 | Luebke et al. | ............. 340/5.62 |
| 6,658,328 | B1 | * | 12/2003 | Alrabady et al. | .............. 701/1 |
| 6,798,336 | B1 | * | 9/2004 | Kanda et al. | .............. 340/5.61 |

FOREIGN PATENT DOCUMENTS

JP    A-2002-47839    2/2002

* cited by examiner

*Primary Examiner*—Edwin C. Holloway, III
(74) *Attorney, Agent, or Firm*—Posz Law Group, PLC

(57) ABSTRACT

In a security ECU, a CPU instructs a request generation circuit to generate a request signal in the normal operation mode. Thereafter, the CPU shifts from the normal operation mode to the low-power consumption mode. The request generation circuit utilizes clock signals generated by a clock signal generation circuit and continues operation even after the CPU shifts to the low-power consumption mode. Thus, the time for which the CPU operates in the normal operation mode can be reduced, and the power consumption of the entire system is thereby reduced.

24 Claims, 6 Drawing Sheets

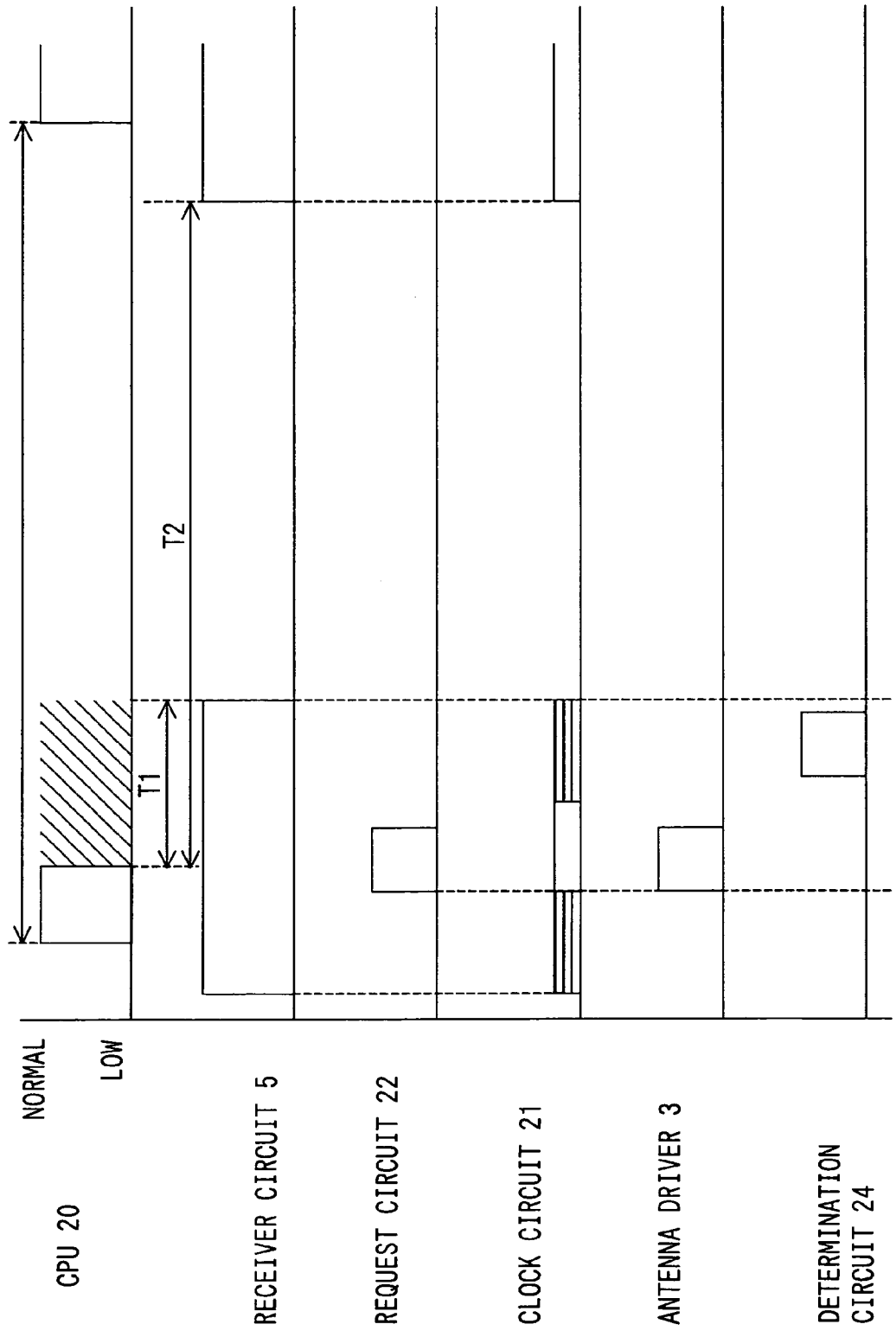

IN-VEHICLE EQUIPMENT REMOTE CONTROL SYSTEM

CROSS REFERENCE TO RELATED APPLICATION

This application is based on and incorporates herein by reference Japanese Patent Application No. 2003-99439 filed on Apr. 2, 2003.

FIELD OF THE INVENTION

The present invention relates to an in-vehicle equipment remote control system which controls the operation of in-vehicle equipment by two-way communication between in-vehicle equipment and a portable unit.

BACKGROUND OF THE INVENTION

Various in-vehicle equipment remote control systems are proposed. One of such systems is an electronic key system. In this system, an ID code is checked by two-way communication between a portable electronic key and in-vehicle equipment. Based on the result of the checking, the status of doors, for example, a locked state or unlocked state, is controlled to change. Further, when a holder of the electronic key is in the vehicle compartment, releasing of the steering lock or starting of the engine is permitted.

In this electronic key system, predetermined detection areas are established inside and outside the vehicle. A request signal is sent out from the transmitters in the in-vehicle equipment in the detection areas at predetermined time intervals. Thus, the electronic key holder is constantly monitored when he/she approaches or gets in or out of the vehicle.

For example, the holder of the electronic key approaches the vehicle in an attempt to get in it, and enters one of the detection areas. In response to the request signal from the vehicle, the electronic key transmits a response signal to the in-vehicle equipment. On receipt of the response signal, the in-vehicle equipment further carries out communications with the electronic key in order to check whether the ID code of the electronic key matches with a previously registered ID code. Thus, the in-vehicle equipment acquires the ID code from the electronic key.

When the acquired ID code matches with the registered ID code, the in-vehicle equipment gives an in-vehicle door lock controller a control signal to bring the doors into the unlock standby state. When the electronic key holder touches a door handle after this state is established, the door lock controller detects that through a touch sensor or the like, and then unlocks the doors.

When the holder of the electronic key stops the vehicle engine and gets out of the vehicle, the detection area of the portable key moves from the inside to the outside of the vehicle compartment. In this case, when a door lock switch provided, for example, in proximity to a door handle is operated, the doors are locked.

According to the above electronic key system, the holder of the electronic key can lock and unlock the doors without manipulating the electronic key. This enhances the electronic key holders' convenience.

In this electronic key system, however, even when the vehicle has been parked, the in-vehicle equipment periodically performs the operation of detecting the electronic key. This increases its power consumption.

SUMMARY OF THE INVENTION

It is an object of the present invention to provide an in-vehicle equipment remote control system, wherein the operation of detecting a portable key is periodically performed and yet the power consumed in the detecting operation can be reduced.

In an in-vehicle equipment remote control system according to the present invention, a microcomputer instructs a request signal generation circuit to generate a request signal when in the normal operation mode. Thereafter, the microcomputer shifts from the normal operation mode to the low-power consumption mode. After the microcomputer shifts to the low-power consumption mode, the request signal generation circuit utilizes clock signals generated by a clock signal generation circuit, and continues its operation. Thus, the time for which the microcomputer operates in the normal operation mode can be reduced, and the power consumption of the entire system can be significantly reduced.

Further, according the present invention, when a response signal from the portable unit is received, the microcomputer is brought into the low-power consumption mode. The microcomputer is started to operate in the normal operation mode by a determination circuit only when a response signal is actually received. Therefore, the time for which the microcomputer operates in the normal operation mode can be reduced. Thus, the power consumption of the system can be reduced.

Further, according to the present invention, the microcomputer operates in the normal operation mode only in the initial stage of the operation of detecting the portable unit and starts the request signal generation circuit. After the microcomputer starts the request signal generation circuit, it is kept in the low-power consumption mode until the next request signal is sent out, unless reception of a response signal is determined by the determination circuit. Therefore, the duration of operation in the normal operation mode can be significantly reduced as compared with a system, wherein the microcomputer is kept in the normal operation mode throughout the detecting operation.

BRIEF DESCRIPTION OF THE DRAWINGS

The above and other objects, features and advantages of the present invention will become more apparent from the following detailed description made with reference to the accompanying drawings. In the drawings:

FIG. 10 is a waveform chart illustrating operation of each circuit in the security ECU in the second embodiment.

DETAILED DESCRIPTION OF THE PREFERRED EMBODIMENT

An in-vehicle equipment remote control system is constructed as an electronic key system. However, the remote control system may be applied to the remote control of other in-vehicle equipment or of other than in-vehicle equipment.

First Embodiment

In an electronic key system in this embodiment, an ID code is checked between the inside and the outside of a vehicle through two-way communications with a portable unit, which is an electronic key. Based on the result of the checking, a security ECU installed in the vehicle controls in-vehicle equipment such as door lock device and a steering lock device. Further, the security ECU controls starting of a vehicle engine (not shown).

Figure 1:
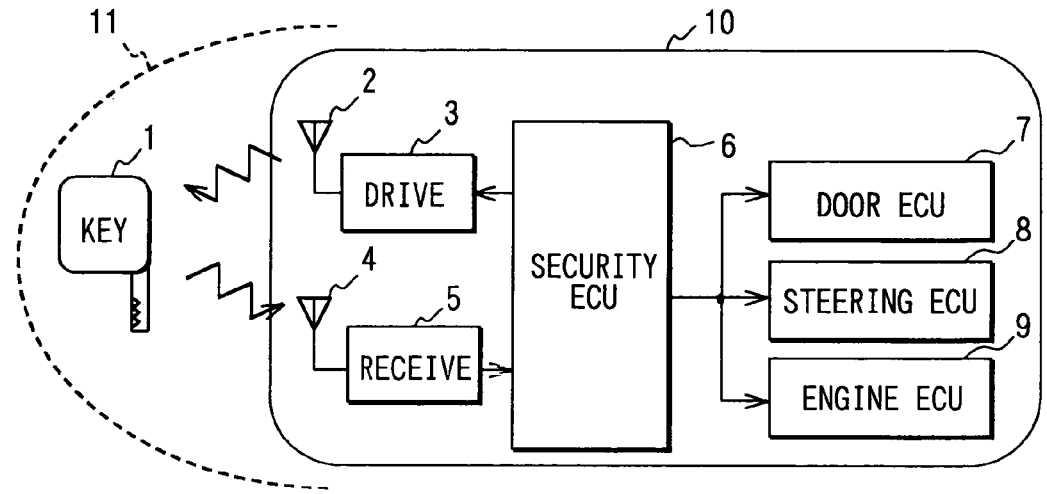
FIG. 1 is a block diagram illustrating an electronic key system according to a first embodiment of the present invention.

Specifically, as illustrated in FIG. 1, a vehicle 10 is provided with a transmitting antenna 2 and an antenna driver 3, so that a request signal is sent out at predetermined time intervals according to an instruction from a security ECU 6. The transmitting antenna 2 and the antenna driver 3 are installed at a plurality of points in the vehicle 10. The range of request signals sent out through the individual transmitting antennas 2 is set to approximately 0.7 to 1.0 m. Therefore, when the vehicle 10 is parked, detection areas 11 corresponding to the ranges of the request signals are formed around the vehicle 10. Thus, when a holder of the portable unit 1 approaches the vehicle 10, it can be immediately detected.

The portable unit 1 has a transmitter-receiver circuit. The circuit receives the request signal transmitted through the transmitting antenna 2, and outputs a response signal in response to the request signal. Thereafter, the circuit outputs a predetermined ID code signal in two-way communication. Therefore, when the portable unit 1 enters the detection area 11, the circuit immediately receives the request signal, and sends out the response signal or the like.

A receiving antenna 4 and a receiver circuit 5 are installed in the vehicle compartment of the vehicle 10 to receive the response signal and ID code signal sent out from the portable unit 1. The response signal and ID code signal received by the receiver circuit 5 are outputted to the security ECU 6. The security ECU 6 starts its microcomputer (CPU) according to the response signal. When the security ECU 6 receives the ID code signal, the security ECU 6 determines whether the ID code matches with the previously registered ID code.

Each door of the vehicle 10 is provided with a door lock ECU 7. The door lock ECUs 7 lock and unlock the respective doors or bring the doors into an unlock standby state. When in the unlock standby state, the door is locked but can be unlocked by the holder of the portable unit 1 touching its door outside handle (door handle). The door lock ECUs 7 operate in response to the instruction signals from the security ECU 6.

More specifically, when the security ECU 6 determines that the received ID code and the registered ID code satisfy predetermined relation, that is, the ID code agreement is confirmed, the security ECU 6 gives an instruction to each door lock ECU 7. The instruction signal instructs the door lock ECU 7 to bring the door locks into the unlock standby state. Based on the instruction signal, the door lock ECU 7 brings the door into the unlock standby state.

The door handle of each door of the vehicle 10 is provided with a touch sensor (not shown), which is capable of detecting when the holder of the portable unit 1 touches the door handle. The door handles are also provided with a door lock switch which is constituted as a push switch. Once the ID code agreement has been confirmed, the door can be locked by operating the door lock switch.

Once the door lock ECU 7 has brought the door into the unlock standby state according to the instruction signal from the security ECU 6, the following takes place: when it is detected by the touch sensor that the holder of the portable unit 1 has touched the door handle, the door lock ECU 7 unlocks the door. More specifically, when the holder of the portable unit 1 performs door opening operation for opening a door, the door is automatically unlocked.

In addition, the electronic key system in this embodiment is provided with a steering lock ECU 8 and an engine ECU 9 for the enhancement of the security of the vehicle 10. The steering lock ECU 8 and the engine ECU 9 respectively turn on and of f the steering lock and control switching between the permission and inhibition of starting the vehicle engine according to instruction signals from the security ECU 6.

More specifically, when the holder of the portable unit 1 opens a door and gets in the vehicle 10, the security ECU 6 carries out the following: it conducts two-way communication with the portable unit 1 through the transmitting antennas 2 and the receiving antenna 4 installed in the vehicle compartment. Thus, the security ECU 6 checks the ID code again. When the engine switch provided in the vehicle is operated, the steering lock ECU 8 inquires the security ECU 6 whether the steering lock may be released. When the result of ID code check is acceptable, the security ECU 6 responds to the steering lock ECU 8 to permit the steering lock to be released. Based on this response, the steering lock ECU 8 releases the steering lock.

At this time, the security ECU 6 also outputs an instruction signal to the engine ECU 9 to release the inhibition of starting of the engine. Thus, the holder of the portable unit 1 can perform various operations, from unlocking the door before getting in the vehicle to starting the engine, without manipulating the portable unit 1.

When the vehicle 10 is parked, the engine switch is turned off and then the holder of the portable unit 1 gets out of the vehicle, the following takes place: when it is detected that the door lock switch provided on the door handle has been operated, the security ECU 6 outputs an instruction signal to the door lock ECU 7 to lock the corresponding door. At the same time as the doors being locked, the security ECU 6 instructs the engine ECU 9 to bring the engine into a start-inhibited state.

With the electronic key system in this embodiment, the user can let various operations be automatically performed only by carrying the portable unit 1: the doors are automatically locked and unlocked and the security of the vehicle is automatically established and released.

Figure 2:
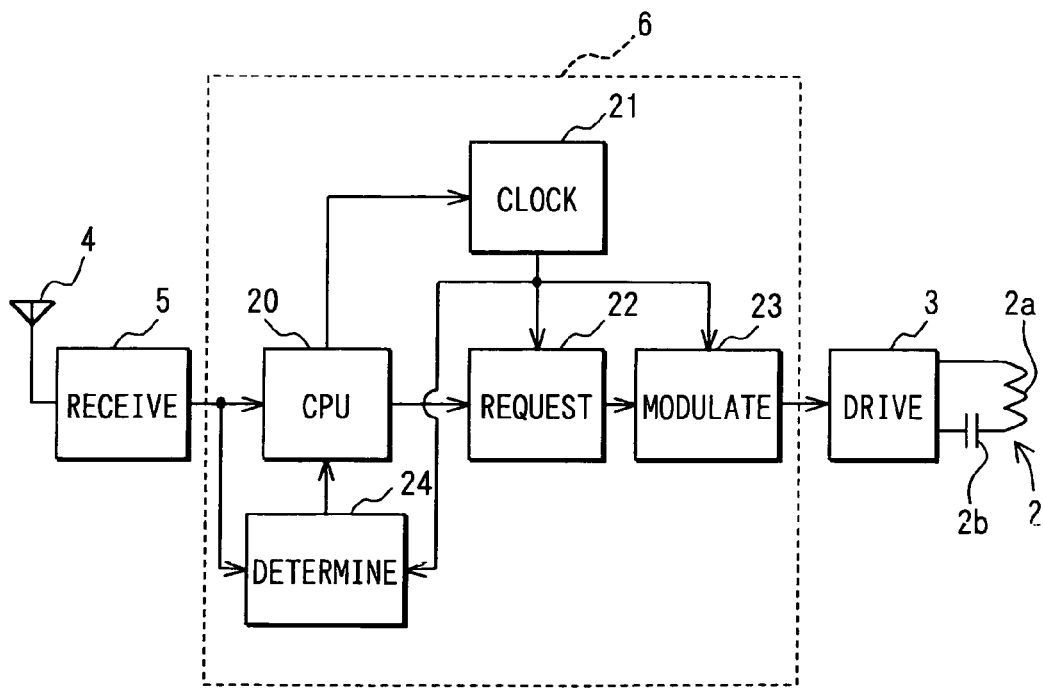
FIG. 2 is a block diagram illustrating a security ECU in the first embodiment.

As illustrated in FIG. 2, the security ECU 6 has a CPU 20 which checks the ID code and outputs instruction signals to the door lock ECUs 7 and the like.

The security ECU 6 also has a request generation circuit 22 which generates the request signal and starts operation when it is given a start signal by the CPU 20. The request signal generation circuit 22 generates pulse signals as the request signal which changes its output level in fixed patterns. For example, the pulse signals which alternately turn on and off at predetermined intervals are considered to represent "0" bit, and pulse signals whose ON period is longer than the period representing "0" bit are considered to represent "1" bit. The request signal generation circuit 22 generates pulse signals as the request signal whose pattern indicates a certain code in accordance with this rule.

The security ECU 6 has a clock generation circuit 21. The clock generation circuit 21 comprises an oscillator which oscillates at a predetermined frequency (e.g., several hundred kilohertz), and generates clock signals by the oscillation of the oscillator. The clock generation circuit 21 is used for modulating the request signal. The circuit 21 supplies the generated clock signals to a modulation circuit 23. In this embodiment, however, these clock signals are also supplied to the request signal generation circuit 22 and a determination circuit 24. Thus, even when the CPU 20 is brought into the low-power consumption mode, such as low-speed mode or sleep mode, and is reduced in operating speed or stopped, the request signal generation circuit 22 and the determination circuit 24 can operate on the basis of the clock signal.

The clock generation circuit 21 has an input port through which start and stop signals (ON and OFF signals) from the CPU 20 are inputted. When a start (ON) signal is inputted through the input port, the circuit 21 generates clock signals; when a stop (OFF) signal is inputted, the circuit 21 stops its operation.

The modulation circuit 23 is constructed with, for example, an AND circuit, and outputs the clock signals inputted when the pulse signal inputted from the request signal generation circuit 22 is ON to the antenna drivers 3. The antenna driver 3 is formed, for example, by connecting in series a p-channel field-effect transistor connected with a power supply and a n-channel field-effect transistor connected with ground. The midpoint between the transistors is connected with a coil 2a of the corresponding transmitting antenna 2. The gates of both the transistors are supplied with the output of the modulation circuit 23. Therefore, when the clock signal is inputted to the gates, the coils 2a are connected with the power supply or ground according to turn-on/off of the clock signal.

The transmitting antenna 2 is constructed with the coil 2a and a resonance capacitor 2b which forms a resonance circuit together with the coil 2a. Thus, when the clock signal is supplied to the gates of both the field-effect transistors constituting the antenna driver 3, resonant operation occurs in the resonance circuit. Therefore, an alternating current is passed through the coil 2a. As a result, a radio wave corresponding to the frequency of the alternating current is sent out from the coil 2a. Thus, the modulated request signal outputted from the modulation circuit 23 is sent out through the transmitting antenna 2.

The determination circuit determines whether a signal received by the receiver circuit 5 is the response signal transmitted from the portable unit 1 in response to the request signal. More specifically, when the portable unit 1 receives the request signal, the unit 1 modulates the pulse signal indicating a certain code in accordance with the same rule as described above and sends out the signal as the response signal. The receiver circuit 5 demodulates the modulated response signal and supplies the signal to the determination circuit 24. The determination circuit 24 compares the response signal supplied from the receiver circuit 5 with a previously stored response signal. When the signals match each other, the determination circuit 24 outputs a start signal to the CPU 20.

At this time, the receiver circuit 5 also inputs the demodulated response signal to the CPU 20. However, since the operation of the CPU 20 is at a stop, any processing is not performed based on the response signal. The determination circuit 24 is fed with the clock signal by the clock generation circuit 21, and the determination circuit 24 operates on the basis of the clock signal. When the start signal from the determination circuit 24 is inputted to the interrupt port of the CPU 20, the CPU 20 changes its operation mode from the low-power consumption mode to the normal operation mode.

Figure 3:
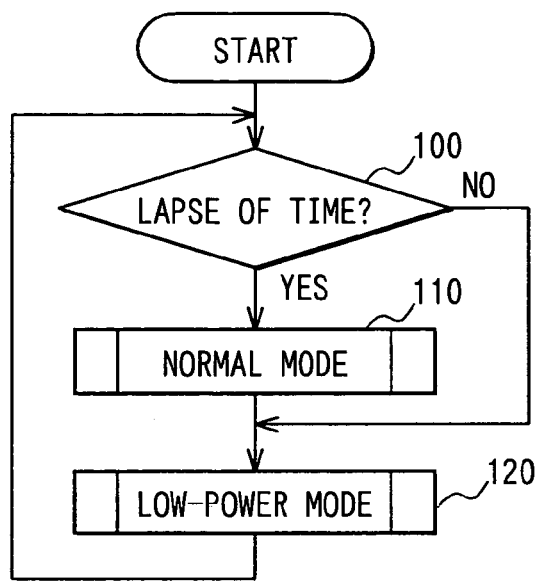
FIG. 3 is a flowchart illustrating processing by a CPU related to switching between the normal operation mode and the low-power consumption mode in the first embodiment.
Figure 4:
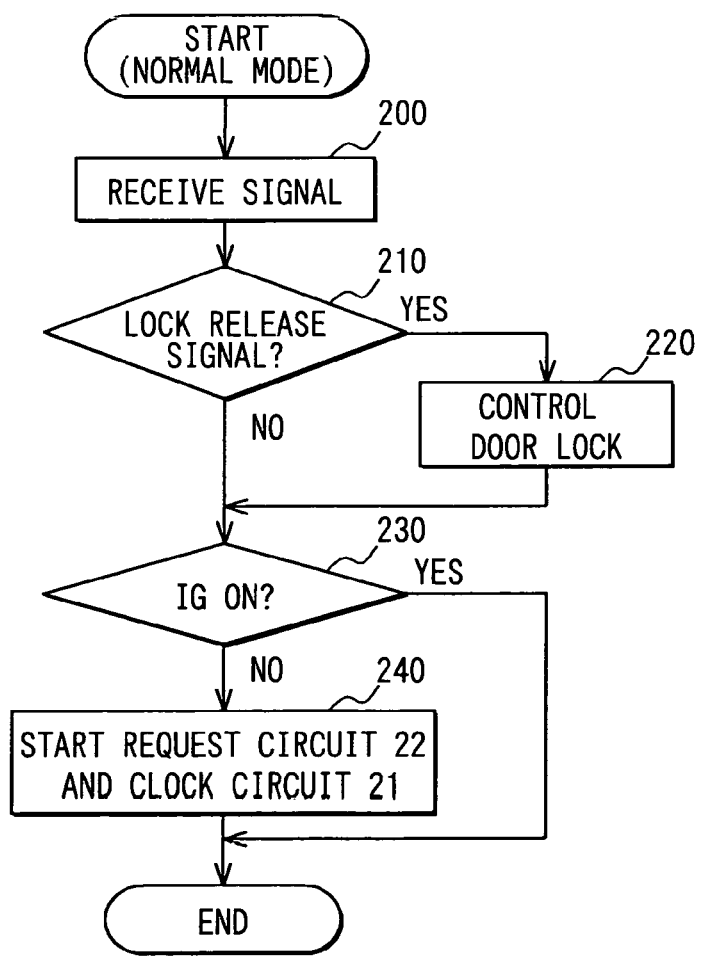
FIG. 4 is a flowchart illustrating processing by the CPU in the normal operation mode in the first embodiment.
Figure 5:
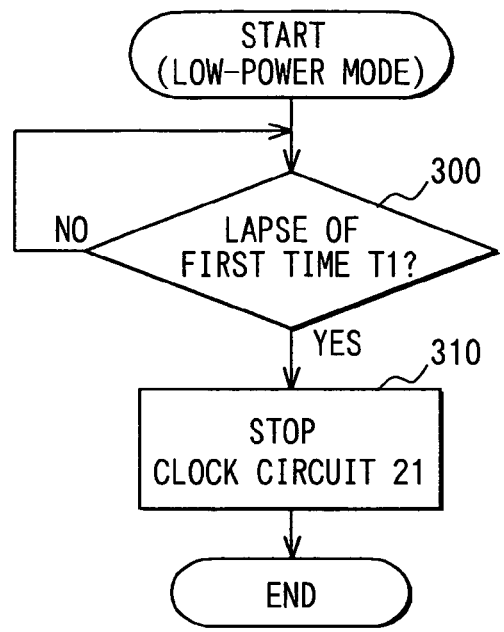
FIG. 5 is a flowchart illustrating processing by the CPU in the low-power consumption mode in the first embodiment.
Figure 6:
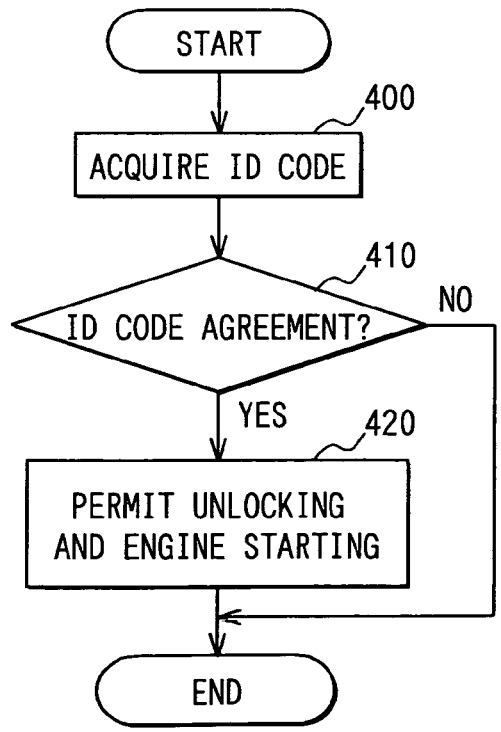
FIG. 6 is a flowchart illustrating processing performed by the CPU when started by a determination circuit in the first embodiment.

Referring to the flowcharts in FIG. 3 to FIG. 6 and the waveform chart in FIG. 7, the operation of the security ECU 6 will be described. FIG. 3 is a flowchart illustrating processing by the CPU 20 related to switching between the normal operation mode and the low-power consumption mode; FIG. 4 and FIG. 5 are flowcharts illustrating processing by the CPU 20 in the normal operation mode and in the low-power consumption mode; and FIG. 6 is a flowchart illustrating processing performed by the CPU 20 when started by the determination circuit 24.

Figure 7:
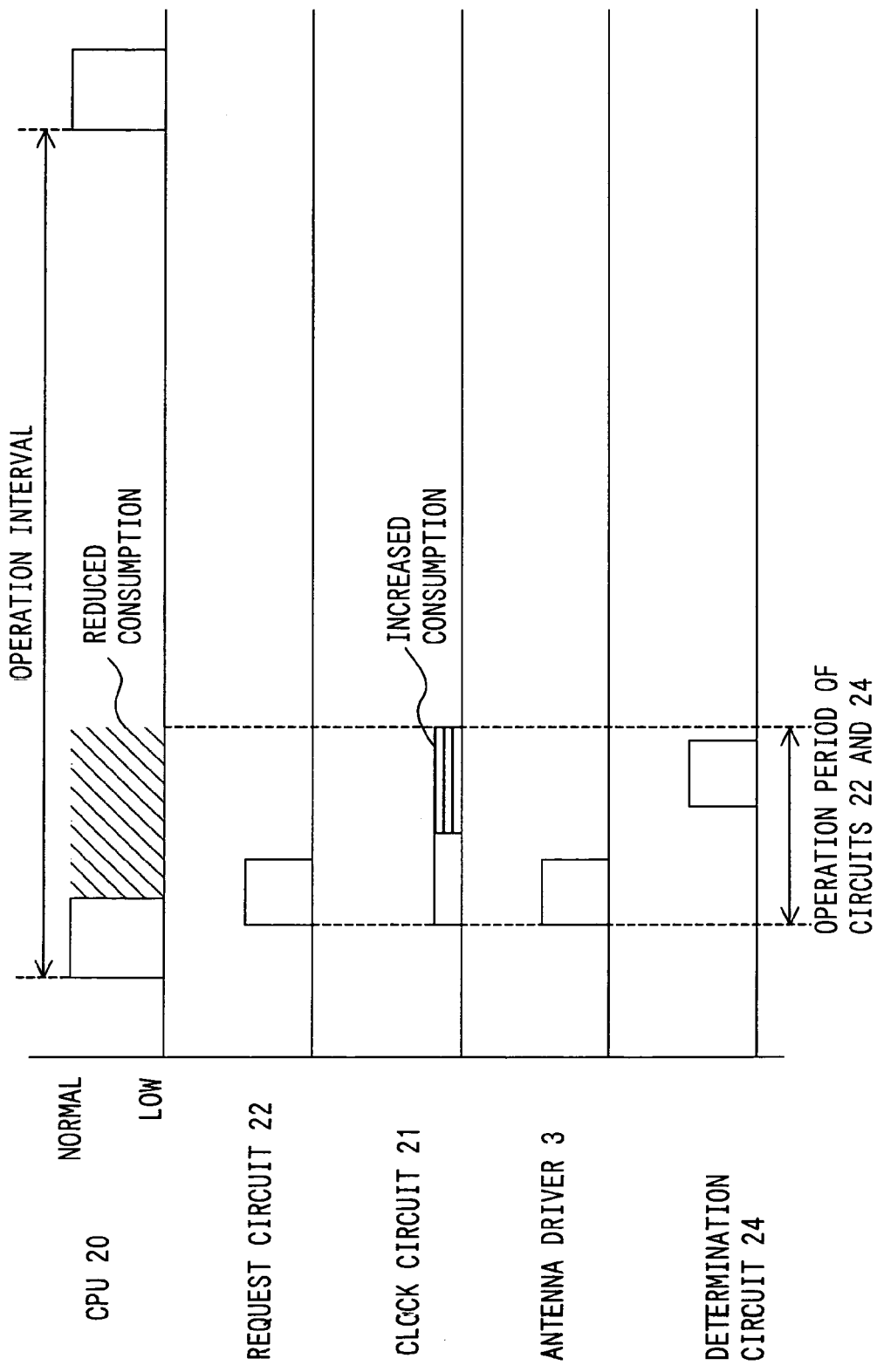
FIG. 7 is a waveform chart illustrating operation of each circuit in the security ECU in the first embodiment.

As illustrated in FIG. 7, the CPU 20 periodically operates in the normal operation mode at predetermined time intervals (e.g. 300 ms). After performing required processing, the CPU 20 shifts to the low-power consumption mode. For this reason, at step 100 in FIG. 3, the CPU 20 determines whether a predetermined time equivalent to duty cycle has passed after the previous start of operation in the normal operation mode. When the predetermined time has passed, the normal operation mode is established at step 110. When the predetermined time has not passed yet, the low-power consumption mode is established at step 120.

Next, referring to the flowchart in FIG. 4, processing performed in the normal operation mode will be described. At step 200, the CPU 20 performs reception processing and causes the receiver circuit 5 to take in a reception signal. The portable unit 1 is provided with a switch for releasing the door lock. The above processing is for checking whether a lock release signal arising from the switch operation has been received by the receiver circuit 5. Needless to add, when the portable unit 1 is not provided with such a switch, the processing of step 200 to step 220 may be omitted.

At step 210, it is determined whether the above-mentioned lock release signal has been received. When it is determined that the lock release signal has been received, the operation proceeds to step 220, and the CPU 20 outputs an instruction signal to the door lock ECU 7 to release the corresponding door lock.

At step 230, it is determined whether the IG switch of the vehicle has been turned on to start the engine. When the engine has been started, the portable unit 1 need not continue detecting operation because the holder of the portable unit 1 is in the vehicle. Therefore, the normal operation mode is terminated. When the engine has not been started yet, the operation proceeds to step 240, and the CPU 20 outputs a start signal to the clock generation circuit 21 and the request generation circuit 22. As illustrated in FIG. 7, as a result, the clock generation circuit 21 starts outputting clock signals. At the same time, the request generation circuit 22 starts generating a request signal on the basis of the clock signals. As further illustrated in FIG. 7, the request signal generated by the request generation circuit 22 is modulated by the modulation circuit 23, and then outputted to the antenna drivers 3. Then, a modulated request signal is sent out through the transmitting antenna 2.

After starting the clock generation circuit 21 and the request generation circuit 22 at step 240, the CPU 20 changes its operation mode from the normal operation mode to the low-power consumption mode. Conventionally, the CPU is kept in the normal operation mode throughout the period from transmission of a request signal to reception of a response signal. Therefore, the high power consumption of the CPU is caused. In this embodiment, meanwhile, immediately after starting the clock generation circuit 21 and the request generation circuit 22, the CPU 20 shifts to the low-power consumption mode. Therefore, the power consumption of the CPU 20 can be significantly reduced as compared with conventional cases, as illustrated with shading (hatched lines) in FIG. 7.

Next, referring to the flowchart in FIG. 5, processing by the CPU 20 in the low-power consumption mode will be described. In the low-power consumption mode, only very limited functions are carried out at low speed. More specifically, when the portable unit 1 is in one of the detection areas 11 around the vehicle after the clock generation circuit 21 and the request generation circuit 22 are started, lapse of time is counted so that it may be compared with a first predetermined time T1. The first predetermined time T1 is a time sufficient for the response signal returned by the portable unit 1 to arrive.

When it is determined at step 300 that the first predetermined time T1 has passed, the CPU 20 outputs the stop signal to the clock generation circuit 21 at step 310 to stop the operation of generating the clock signal. Thus, the clock generation circuit 21 can be operated only for the period from generation of the request signal to reception of the response signal. Further, when the operation of the clock generation circuit 21 is stopped, the request generation circuit 22, modulation circuit 23, and determination circuit 24, which operate on the basis of clock signals from the clock generation circuit 21, also stop their operations. Therefore, turning off the clock generation circuit 21 contributes to reduction in the power consumption of the security ECU 6.

When the CPU 20 has been brought into the low-power consumption mode, and the response signal is returned from the portable unit 1 while the first predetermined time T1 is counted at step 300, the following takes place: the determination circuit 24 which operates on the basis of the clock signals as illustrated in FIG. 7 determines whether the response signal matches with the previously stored response signal. When the determination circuit 24 determines that the signals are not matched with each other, the CPU 20 is kept in the low-power consumption mode until the next time of operation in the normal operation mode. When the determination circuit 24 determines the signals match each other, the circuit 24 outputs the start signal to the CPU 20. When the start signal is inputted to the interrupt port of the CPU 20, the CPU 20 changes its operation mode from the low-power consumption mode to the normal operation mode. The processing performed by the CPU 20 at this time will be described, referring to the flowchart in FIG. 6.

At step 400, in order to check whether the ID code of the portable unit 1 which sent the response signal and the previously registered ID code satisfy predetermined relation, such as agreement, the CPU 20 further communicates with the portable unit 1. Thus, the CPU 20 acquires the ID code from the portable unit 1. When it is determined as Step 410 that the acquired ID code and the registered ID code satisfy the predetermined relation, the CPU 20 gives an instruction signal to the door lock ECUs 7 at step 420 to bring the respective doors into an unlock standby state. When the holder of the portable unit 1 gets in the vehicle and operates the engine switch, the CPU 20 permits the steering ECU 8 to release the steering lock or permits the engine ECU 9 to start the engine. Alternatively, when the holder of the portable unit 1 gets out of the vehicle and operates a door lock switch, the CPU 20 instructs the door lock ECUs 7 to lock the respective doors.

As mentioned above, in this embodiment, the period for which the CPU 20 operates in the normal operation mode can be reduced. Therefore, the power consumption of the security ECU 6 can be reduced as described above and shown in FIG. 7. The duration of the operation and hence the power consumption of the clock generation circuit 21 become more than in the conventional case. However, the power consumption of the clock generation circuit 21 is less than that of the CPU 20, and the overall power consumption can be significantly reduced.

Second Embodiment

Next, a second embodiment of the present invention will be described. In this embodiment, only the configuration of the security ECU 6 is different from that in the first embodiment. Consequently, only the configuration and operation of the security ECU 6 in this embodiment will be described below. In the following description, the same components as in the first embodiment will be provided with the same reference numerals, and their detailed description will be omitted.

Figure 8:
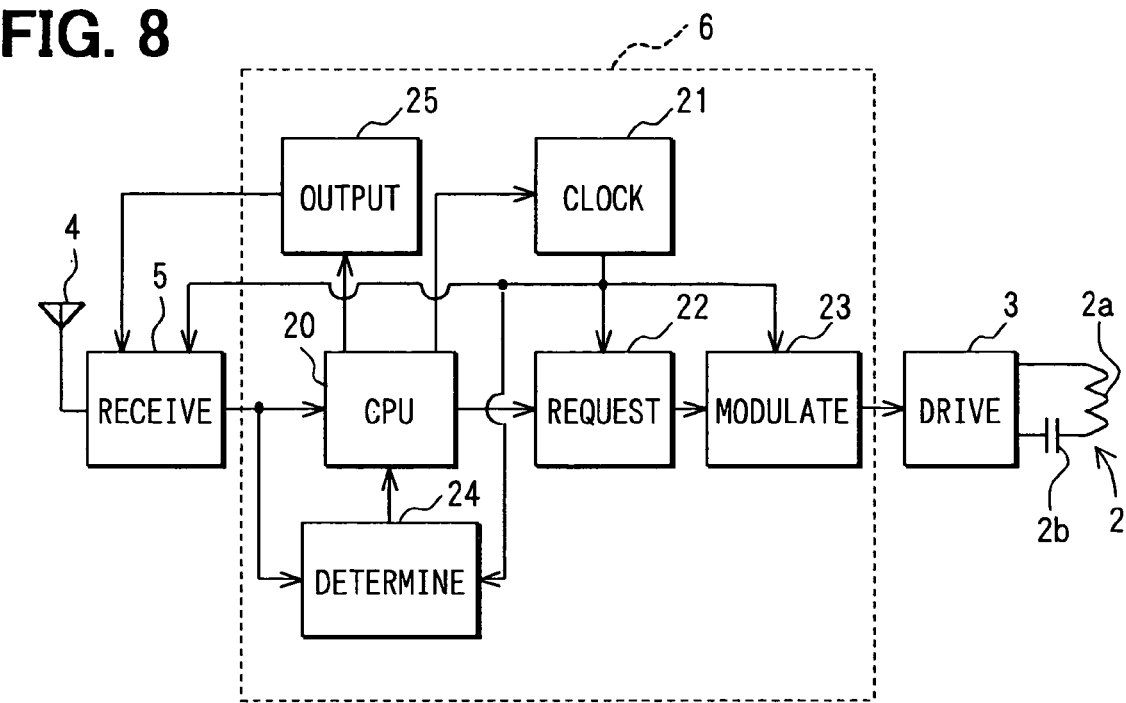
FIG. 8 is a block diagram illustrating a security ECU in a second embodiment of the present invention.

FIG. 8 is a block diagram illustrating the security ECU 6 in this embodiment. As illustrated in FIG. 8, this embodiment is implemented by adding an output circuit 25 to the first embodiment. The output circuit 25 controls power supply to the receiver circuit 5 according to the start and stop signals from the CPU 20. More specifically, the circuit 25 supplies power to the receiver circuit 5 only for the period from the time the start signal is outputted from the CPU 20 to the time the stop signal is outputted from it.

The receiver circuit 5 is supplied with power and performs operation only for the above period. In this embodiment, the receiver circuit 5 is so constructed that it performs this operation on the basis of the clock signal from the clock generation circuit 21 for the period. Thus, it is unnecessary to provide the receiver circuit with its own oscillator or the like, and the construction of the circuit can be simplified.

Next, the operation of the security ECU 6 in this embodiment will be described, referring to the flowchart in FIG. 9 and the waveform chart in FIG. 10. This embodiment is different from the first embodiment only in processing performed by the CPU 20 in the low-power consumption mode. For this reason, only the processing in the low-power consumption mode will be described below.

Figure 9:
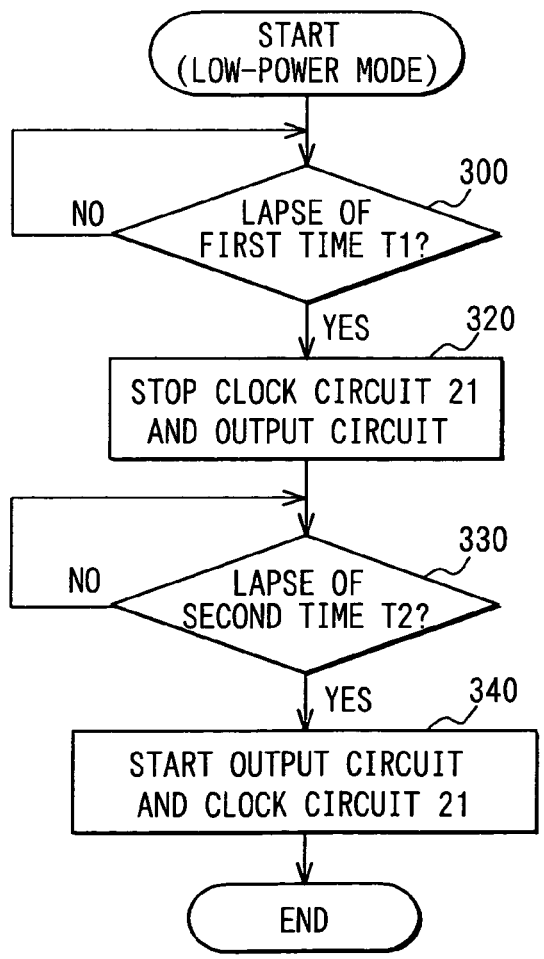
FIG. 9 is a flowchart illustrating processing by a CPU in the low-power consumption mode in the second embodiment.

FIG. 9 is a flowchart illustrating processing in the low-power consumption mode. When the portable unit 1 is in one of the detection areas 11 around the vehicle after the clock generation circuit 21 and the request generation circuit 22 are started, lapse of time is counted to be compared with the first predetermined time T1. The first predetermined time T1 is a time sufficient for the response signal returned by the portable unit 1 to arrive. When it is determined at step 300 that the first predetermined time T1 has passed, the CPU 20 outputs the stop signal to the clock generation circuit 21 at step 320 to stop the operation of generating the clock signal. Further, the CPU 20 outputs the stop signal to the output circuit 25 to stop power supply to the receiver circuit 5. Thus, after the response signal reception period T1 has passed, the operation of the clock generation circuit 21 and the receiver circuit 5 can be stopped.

Next, at step 330, it is determined whether a second predetermined time T2 has passed after start of the low-power consumption mode. When it is determined that the second predetermined time T2 has passed, the CPU 20 outputs the start signal to the clock generation circuit 21 and the output circuit 25 to activate the receiver circuit 5 at step 340. That is, as illustrated in FIG. 10, the operation of the receiver circuit 5 and the clock generation circuit 21 is started in the low-power consumption mode before the CPU 20 starts operation in the normal operation mode again.

A predetermined stabilization time is sometimes required before the clock generation circuit 21 outputs clock signals with stability. When the clock generation circuit 21 is started in the normal operation mode in such a case, the circuits which operate on the basis of the clock signals must delay their starting until the clock signal generation is stabilized. This can result in a lengthened time of operation in the normal operation mode. To cope with this, the clock generation circuit 21 is started in advance in the low-power consumption mode, as in this embodiment. Thus, the time for which the CPU 20 operates in the normal operation mode can be reduced.

Further, the operation of the receiver circuit 5 is started in the low-power consumption mode in synchronization with start of the clock generation circuit 21. Thus, an advantage is produced when the receiver circuit 5 is intermittently operated and further the CPU 20 operates in the normal operation mode: the above lock release signal from the portable unit 1 can be received by the receiver circuit 5 with reliability.

The present invention is not limited to these embodiments, but can be embodied with various modifications to the extent that the spirit of the present invention is not departed from.

For example, in the above embodiments, after start of the request generation circuit, the CPU 20 is operated in the low-power consumption mode. Alternatively, the CPU 20 may be brought into the low-power consumption mode when the request signal is transmitted and/or when the response signal is received. In this case as well, the time for which the CPU 20 operates in the normal operation mode can be reduced as compared with conventional cases.

In the above embodiments, the CPU 20 controls the start and stop of the clock generation circuit 21 and the receiver circuit 5 (output circuit 25) in the low-power consumption mode. Alternatively, a separate timer circuit may be provided. More specifically, when the CPU 20 operates in the normal operation mode, the timer circuit may be started. After counting a predetermined time, the timer circuit may output a stop signal to the clock generation circuit 21 and the receiver circuit 5 (output circuit 25). With this construction, the operation of the CPU 20 can be substantially completely stopped in the low-power consumption mode.

The above second embodiment is so constructed that the receiver circuit 5 operates on the basis of the clock signal from the clock generation circuit 21. The receiver circuit 5 may be provided with its own oscillator or the like, and only the operating period may be defined by the output circuit 25.

What is claimed is:

1. An in-vehicle equipment remote control system comprising:
    a portable unit which receives a request signal and transmits a response signal in response to the request signal; and
    a controlling means mounted in a vehicle for periodically transmitting the request signal in a predetermined area around the vehicle, and controlling an operation of in-vehicle equipment, when triggered by reception of the response signal from the portable unit,
    wherein the controlling means includes
        a request signal generation circuit for generating the request signal,
        a modulation and transmission circuit for modulating and transmitting the request signal generated by the request signal generation circuit,
        a clock signal generation circuit for generating clock signals used to modulate the request signal in the modulation and transmission circuit, and
        a microcomputer for instructing at least the request signal generation circuit to generate the request signal,
    wherein the microcomputer has a normal operation mode and a low-power consumption mode, instructs the request signal generation circuit to generate the request signal in the normal operation mode, and thereafter shifts from the normal operation mode to the low-power consumption mode, and
    wherein the request signal generation circuit utilizes the clock signals generated by the clock signal generation circuit and continues operation thereof with the clock signals even after the microcomputer shifts to the low-power consumption mode.

2. The in-vehicle equipment remote control system according to claim 1,
    wherein the microcomputer starts the clock signal generation circuit by time when the microcomputer instructs the request signal generation circuit to generate the request signal.

3. The in-vehicle equipment remote control system according to claim 2,
    wherein the microcomputer starts the clock signal generation circuit in the low-power consumption mode before the microcomputer starts operation thereof in the normal operation mode.

4. The in-vehicle equipment remote control system according to claim 2,
    wherein the microcomputer stops the operation of the clock signal generation circuit in the low-power consumption mode when a predetermined time has passed after the microcomputer starts the clock signal generation circuit.

5. The in-vehicle equipment remote control system according to claim 1,
    wherein the controlling means further includes
        a receiver circuit for receiving the response signal from the portable unit, and
        a determination circuit for determining whether the response signal received by the receiver circuit corresponds to a predetermined response signal, and
    wherein the determination circuit operates based on the clock signals generated by the clock signal generation circuit when the microcomputer is in the lo-power consumption mode, and outputs the start signal to the microcomputer to change the operation mode of the microcomputer from the low-power consumption mode to the normal operation mode when the response signal received by the receiver circuit corresponds to the Predetermined response signal.

6. The in-vehicle equipment remote control system according to claim 5,
    wherein the receiver circuit is started by the microcomputer in synchronization with start of the clock signal generation circuit and operates based on the clock signals generated by the clock signal generation circuit, when the microcomputer starts the clock signal generation circuit in the low-power consumption mode before the microcomputer starts operation in the normal operation mode.

7. The in-vehicle equipment remote control system according to claim 5,
wherein the microcomputer communicates with the portable unit to acquire an ID code from the portable unit after being started by the determination circuit, and controls and brings the in-vehicle equipment into a predetermined state when it is confirmed that the ID code and a stored code satisfy predetermined relation.

8. An in-vehicle equipment remote control system comprising:
a portable unit which receives a request signal and transmits a response signal in response to the request signal; and
a controlling means mounted in a vehicle for periodically transmitting the request signal in a predetermined area around the vehicle, and controlling operation of in-vehicle equipment, when triggered by reception of the response signal from the portable unit,
wherein the controlling means includes,
a modulation and transmission circuit for modulating and transmitting the request signal,
a clock signal generation circuit for generating clock signals used to modulate the request signal in the modulation and transmission circuit,
a receiver circuit for receiving the response signal from the portable unit,
a determination circuit for determining whether the response signal received by the receiver circuit corresponds to a predetermined response signal, and
a microcomputer for generating a control signal for controlling the operation of at least the in-vehicle equipment,
wherein the microcomputer has a normal operation mode and low-power consumption mode, and
wherein the determination circuit operates based on the clock signals generated by the clock signal generation circuit, and outputs a start signal to the microcomputer to change the operation mode of the microcomputer from the low-power consumption mode to the normal operation mode when the response signal received by the receiver circuit corresponds to the predetermined response signal under a condition that the response signal is received when the microcomputer is in the low-power consumption mode.

9. The in-vehicle equipment remote control system according to claim 8,
wherein the microcomputer communicates with the portable t to acquire an ID code from the portable unit after being started by the determination circuit, and controls and brings the in-vehicle equipment into a predetermined state when it is confirmed that the ID code and a stored code satisfy a predetermined relation.

10. The in-vehicle equipment remote control system according to claim 8,
wherein the controlling means further includes
a request signal generation circuit for generating and supplying the request signal to the modulation and transmission circuit,
wherein the microcomputer is repeatedly brought into the normal operation mode and the low-power consumption mode in a predetermined cycle, instructs the request signal generation circuit to generate the request signal in the normal operation mode, an thereafter shifts to the low-power consumption mode,
wherein the request signal generation circuit continues operation thereof based on the clock signals generated by the clock signal generation circuit, and
wherein the microcomputer is kept in the low-power consumption mode until a next request signal generation unless the start signal is supplied from the determination circuit.

11. The in-vehicle equipment remote control system according to claim 10,
wherein the microcomputer starts the clock signal generation circuit by time when the microcomputer instructs the request signal generation circuit to generate the request signal.

12. The in-vehicle equipment remote control system according to claim 11,
wherein the microcomputer starts the clock signal generation circuit in the low-power consumption mode before the microcomputer starts operation in the normal operation mode.

13. The in-vehicle equipment remote control system according to claim 11,
wherein the microcomputer stops operation of the clock signal generation circuit in the low-power consumption mode when a predetermined time has passed after the microcomputer starts the clock signal generation circuit.

14. The in-vehicle equipment remote control system according to claim 12,
wherein the receiver circuit is started by the microcomputer in synchronization with start of the clock signal generation circuit and operates based on the clock signals generated by the clock signal generation circuit, when the microcomputer starts the do clock signal generation circuit in the low-power consumption mode before the microcomputer starts operation in the normal operation mode.

15. An in-vehicle equipment remote control system comprising:
a portable unit for receiving a request signal arid transmitting response signal in response to the request signal; and
a controlling means mounted in a vehicle for periodically transmitting the request signal in a predetermined area around the vehicle, and controlling the operation of in-vehicle equipment, when triggered by reception of the response signal from the portable unit,
wherein the controlling means includes
a request signal generation circuit for generating the request signal,
a modulation and transmission circuit for modulating and transmitting the request signal generated by the request signal generation circuit,
a clock signal generation circuit for generating clock signals used to modulate the request signal in the modulation and transmission circuit,
a receiver circuit for receiving the response signal from the portable unit,
a determination circuit for determining whether the response signal received by the receiver circuit corresponds to a predetermined response signal, and
a microcomputer for instructing at least the request si generation circuit to generate the request signal, and generating a control signal for controlling the operation of the in-vehicle equipment,
wherein the microcomputer has a normal operation mode and low-power consumption mode, and instructs the request signal generation circuit to generate the request signal in the normal operation mode, and thereafter shifts from the normal operation mode to the low-power consumption mode, wherein the request signal generation circuit and the determination circuit operate based on the clock signals generated by the clock signal generation circuit, wherein the receiver circuit receives the response signal generated by the request signal generation circuit according to the request signal, and wherein the determination circuit outputs a start signal to the microcomputer to change an operation mode of the microcomputer from the low-power consumption mode to the normal operation mode when the determination circuit determines that the response signal corresponds to the predetermined response signal.

16. The in-vehicle equipment remote control system according to claim 15, wherein the microcomputer communicates with the portable unit to acquire an ID code from the portable unit after started by the determination circuit, and controls and brings the in-vehicle code equipment into a predetermined state when the ID code and a stored code satisfy predetermined relation.

17. The in-vehicle equipment remote control system according to claim 15, wherein the microcomputer starts the clock signal generation circuit by time the microcomputer instructs the request signal generation circuit to generate the request signal.

18. The in-vehicle equipment remote control system according to claim 17, wherein the microcomputer starts the clock signal generation circuit in the low-power consumption mode before the microcomputer starts operation in the normal operation mode.

19. The in-vehicle equipment remote control system according to claim 17, wherein the microcomputer stops the operation of the clock signal generation circuit in the low-power consumption mode when a predetermined time has Passed after the microcomputer starts the clock signal generation circuit.

20. The in-vehicle equipment remote control system to claim 18, wherein the receiver circuit is started by the microcomputer in synchronization with start of the clock signal generation circuit and operates based on the clock signals generated by the clock signal generation circuit, when the microcomputer starts the clock signal generation circuit in the low-power consumption mode before the microcomputer starts the operation in the normal operation mode.

21. A method of controlling an in-vehicle equipment control system, the control system including a portable unit carried by a vehicle user and a control unit provided in a vehicle to control in-vehicle equipment through communication with the portable unit, the control unit including a microcomputer, a clock circuit, a request circuit and a determination circuit, the method comprising:

switching the microcomputer from a low-power mode to a normal mode to start the request circuit to generate a request signal so that the portable unit generates a response signal, upon receipt of the request signal;

switching the microcomputer from the normal mode to the low-power mode after starting the request circuit;

operating the request circuit to continue generation of the request signal by the clock signals of the clock circuit after the microcomputer is switched to the low-power mode;

stopping generation of the clock signals of the clock circuit a predetermined period from generation of the request signal; and switching the microcomputer to the normal mode to start the request circuit again after another predetermined period from a previous switching to the norm mode.

22. The method according to claim 21, wherein the predetermined period is shorter than the another predetermined period and longer than a period in which the request signal is generated in the control unit and the response signal of the portable unit is received in the control unit.

23. The method according to claim 21, farther comprising:

operating, by the clock signals of the clock circuit after the microcomputer is switched to the low-power mode, the determination circuit determine whether the response signal received from the portable unit corresponds to a predetermined signal; and switching the microcomputer to the normal mode before the other predetermined period elapses when the response signal is determined to be in correspondence to the predetermined signal, so tat the microcomputer starts to control the in-vehicle equipment.

24. A method of controlling an in-vehicle equipment control system, the control system including a portable unit carried by a vehicle user and a control unit provided in a vehicle to control in-vehicle equipment through communication with the portable unit, the control unit including a microcomputer, a clock circuit, a receiver circuit and a determination circuit, the method comprising:

switching the microcomputer from a low-power mode to a normal mode to start generation of a request signal from the control unit each time a predetermined period elapses, so that the portable unit generates a response signal upon receipt of the request signal;

switching the microcomputer from the normal mode to the low-power mode after starting the generation of the request signal;

operating, by the clock signals of the clock circuit after the microcomputer is switched to the low-power mode, the receiver circuit to receive the response signal and the determination circuit to determine whether the response signal received from the portable unit corresponds to a predetermined signal; and switching the microcomputer to the normal mode when the response signal is determined to be in correspondence to the predetermined signal irrespective of the predetermined period.

* * * * *